May 30, 1950 — E. G. ANDERSON — 2,509,794
COLLAPSIBLE TRAILER FRAME
Filed Sept. 24, 1947 — 2 Sheets-Sheet 1
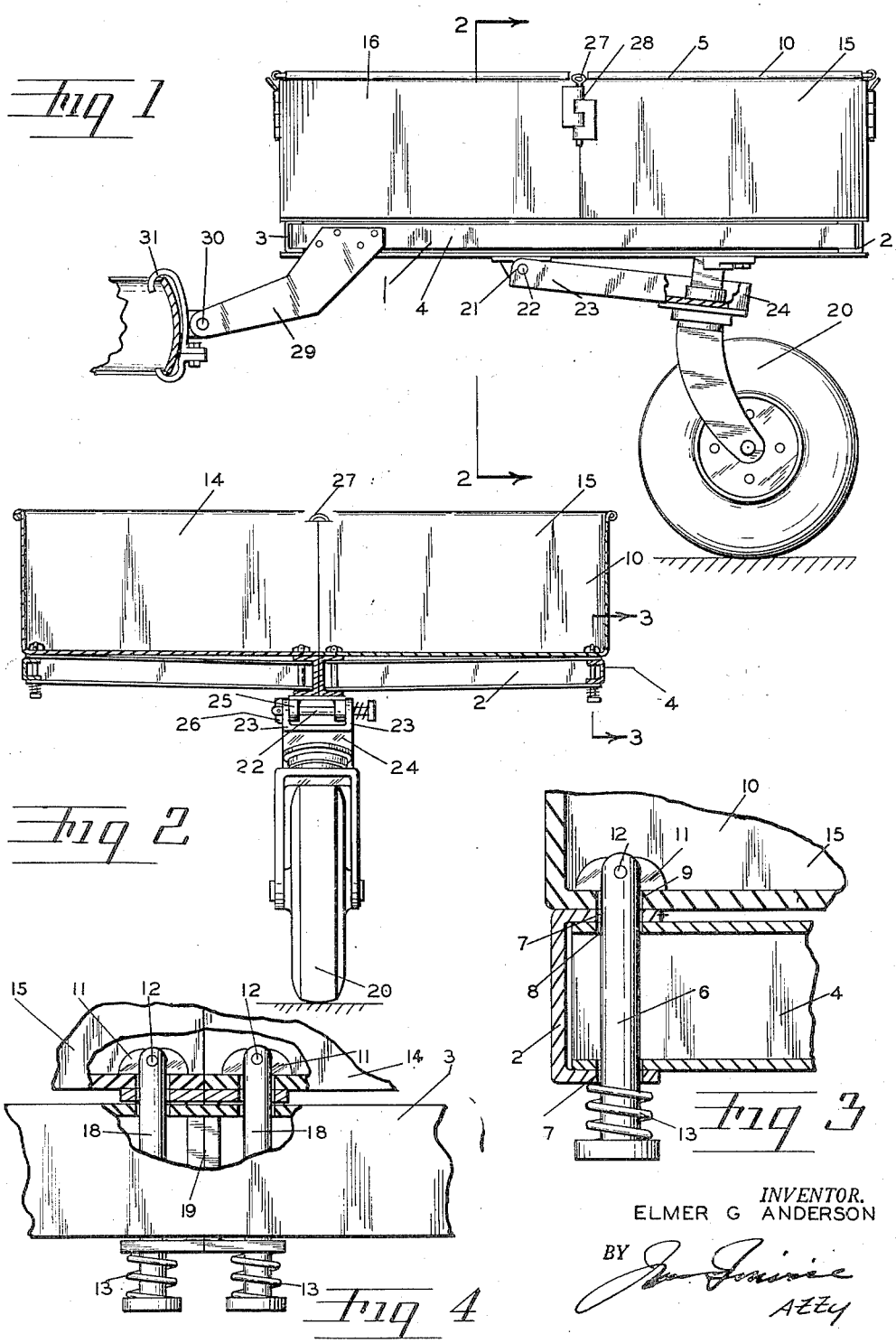
INVENTOR.
ELMER G ANDERSON

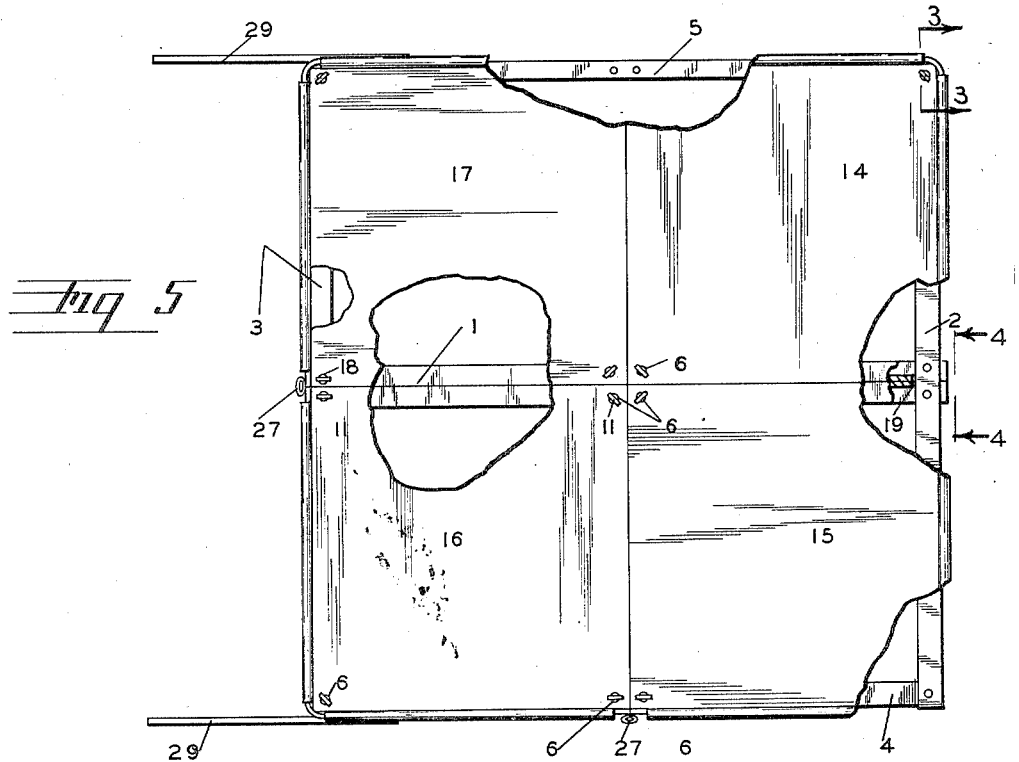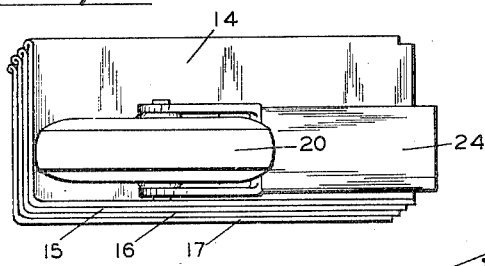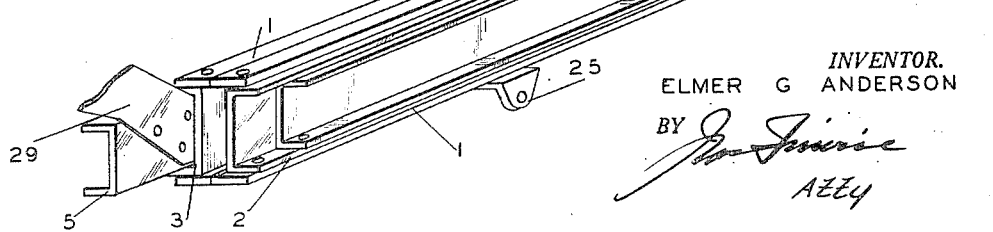

Patented May 30, 1950

2,509,794

UNITED STATES PATENT OFFICE 2,509,794

COLLAPSIBLE TRAILER FRAME

Elmer G. Anderson, Portland, Oreg., assignor of one-half to Victor T. Wiglesworth, Portland, Oreg.

Application September 24, 1947, Serial No. 775,924

2 Claims. (Cl. 296—27)

This invention relates to trailers and is particularly adapted to be used in connection with automobile trailers of the smaller class, particularly the caster wheel type.

The primary object of the invention is to fabricate the trailer in such a manner that it can be kept collapsed and folded into a small package adapted to be stored in the trunk compartment of the automobile while not in use.

A further object of the invention is to so construct the framework and body structure that each piece will nest one within the other after the trailer has been collapsed ready for storage.

These and other incidental objects will be apparent in the drawings, specification and claims.

Referring to the drawings:

Figure 1 is a side view of my new and improved collapsible trailer illustrating the same connected to an automobile bumper.

Figure 2 is a sectional view taken on line 2—2 of Figure 1 looking towards the rear of the trailer.

Figure 3 is an enlarged fragmentary sectional view illustrating the method of locking the framework and body sections together, the same taken on line 3—3 of Figure 2.

Figure 4 is an enlarged fragmentary partially in section view of the framework, body sections and locking bolts particularly to illustrate the manner of connecting the same together. This view is taken on line 4—4 of Figure 5.

Figure 5 is a plan view of the trailer, parts broken away for convenience of illustration.

Figure 6 is a knocked down disassembled view of the body sections having the caster wheel resting therein requiring a minimum of space.

Figure 7 illustrates the nesting together of the frame of the trailer when the same is disassembled or collapsed.

In the drawings:

My new and improved trailer consists of a central beam 1, having transverse end frames 2 and 3 located on either end of the said main beam 1. Side frames 4 and 5 are secured to the extremities of the cross frames 2 and 3.

I will now describe how these frame members are connected together so that they can be readily disassembled or assembled. In Figure 3 I illustrate a typical corner intersection of the end frames 2 and 3 and side frames 4 and 5. I will describe the one shown in the lines 3—3. The pin 6 passes through holes 7 located on the outer end of the end frame 2 and through the holes 8 located on the outer end of the side frame 4 and through the holes 9 located in the corner of the body 10.

A locking key 11 is pivotally mounted at 12 in the end of the pin 6. A spring 13 pulling the pin down against the toggle in the position shown. When it is desired to remove the pin 6 the spring 13 is compressed raising the upper end of the pin and permitting the key to be rotated about its pivot 12 coming in alignment with the pin and permitting the said pin to be removed from the above described holes.

Figure 4 illustrates how the pins are adapted to the main frame 1 connecting the individual body members 14, 15, 16 and 17 to the framework, also illustrating how the end frames 2 and 3 are connected to the main frame 1 providing a relatively rigid connection due to the double pins 18 forcing the members against the web 19 of the central frame providing a more or less three-point connection insuring rigidity of the frame structure.

The trailer is mounted upon the conventional type caster assembly 20 which is pivotally mounted at 21 to the main central frame 1 having a locking bolt 22 passing through the sides 23 of the channel member 24 and through the lugs 25 of the frame 1, being held therein by the locking key 26 of the same type as above described.

The body 5 consisting of the individual body members or sections, said sections being further held together by the locking pins 27 locking the interlocking units 28 together similar to a conventional hinge. Tongues 29 are pivotally connected at 30 to the conventional bumper clamp 31 and are easily removed therefrom.

I will now describe the disassemblying of my new and improved trailer. I do not wish to be limited to the exact method of disassemblying the trailer, but we will assume that the tongue 29 is removed from the pivot connection 30 of the clamps 31. Next the pins 6, 18 and 27 are removed. This permits the removing of the body sections 14, 15, 16 and 17 from the framework, which are stacked as illustrated in Figure 6. The removing of the pins also permitted the disassemblying of the end frames 2 and 3 and side frames 4 and 5 from the main frame 1 and stacked as illustrated in Figure 7, then by removing the bolt 22 of the caster wheel assembly 20 the said caster wheel may be removed from the main frame and nested within the body sections, all of which may be placed in the trunk compartment of the automobile, carrying out the primary object of my invention.

I do not wish to be limited to the exact mechanical construction as illustrated, as other modified equivalents may be substituted still coming within the scope of my claims.

What I claim is:

1. A collapsible vehicle frame comprising a pair of U-shaped central beams formed in the horizontal flanges with openings, front and rear U-shaped beams of less depth than the depth of the pair of U-shaped central beams, the flanges of the front and rear U-shaped beams having openings in alignment with selected openings in the flanges of the central beams, side U-shaped beams of less depth than the central, front and rear beams and having openings aligned with selected openings in the flanges of the central U-shaped beams, a body mounted on the frame, said body having openings in alignment with the openings in the beams, and pins extending through the openings when the frame beams are assembled, whereby when the body is removed and the frame is collapsed, the front and rear beams can be nested in parallel relation in the central beams and the side beams nested in parallel relation in the front and rear beams.

2. A collapsible vehicle frame as defined in claim 1 wherein each side beam is provided with an extended tongue.

ELMER G. ANDERSON.

REFERENCES CITED

The following references are of record in the file of this patent:

UNITED STATES PATENTS

| Number | Name | Date |
| --- | --- | --- |
| 611,675 | Brookmeyer | Oct. 4, 1898 |
| 1,349,344 | O'Neill | Aug. 10, 1920 |
| 2,328,138 | Gosser | Aug. 31, 1943 |